H. CSANYI.
STORAGE BATTERY.
APPLICATION FILED MAY 12, 1919.
1,401,676.
Patented Dec. 27, 1921.
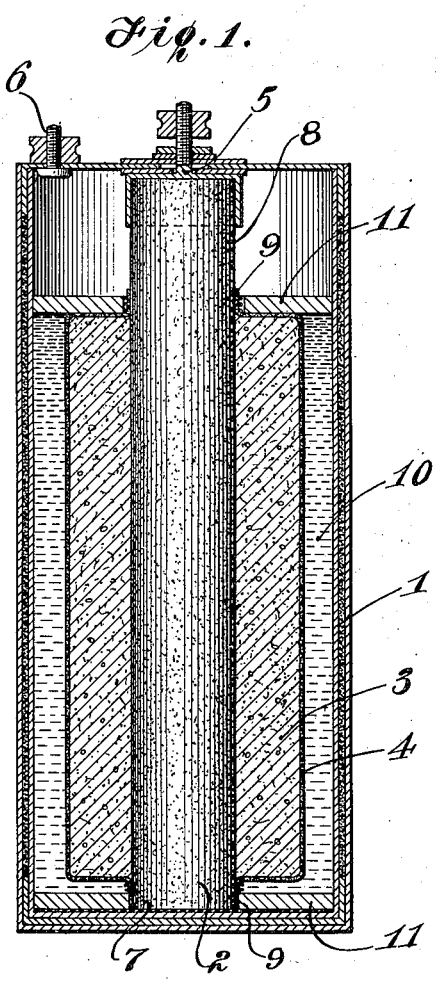
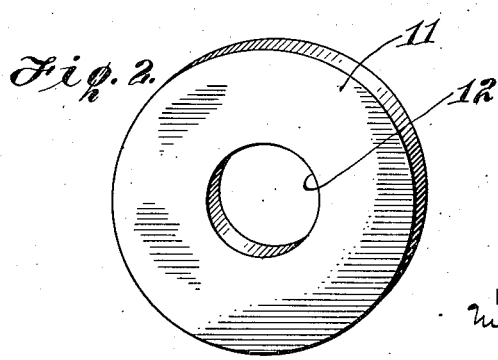
INVENTOR
Henry Csanyi
BY
Meyers, Cushman & Rea.
ATTORNEYS

UNITED STATES PATENT OFFICE.

HENRY CSANYI, OF NEW YORK, N. Y.

STORAGE BATTERY.

1,401,676. Specification of Letters Patent. Patented Dec. 27, 1921.

Application filed May 12, 1919. Serial No. 296,576.

*To all whom it may concern:*

Be it known that I, HENRY CSANYI, a citizen of the United States, residing at New York, in the county of New York and State of New York, have invented new and useful Improvements in Storage Batteries, of which the following is a specification.

This invention relates to storage batteries and is in the nature of an improvement upon the battery constituting the subject matter of my prior Patent No. 1,279,279, dated September 17, 1918.

In said patent I have shown a structure wherein a metallic casing, in the form of a zinc or lead cylinder constitutes the negative electrode, while the positive electrode comprises a carbon core or stick positioned centrally and extending longitudinally of the casing, this carbon core being embedded, for the greater portion of its length, in a cloth-covered body of depolarizing material or paste worked into cylindrical form. A pronounced space is left between the paste-like body of depolarizing material and the wall of the metallic casing or negative electrode and this space is filled with a fluid-like electrolyte.

In said patent, in order to maintain the positive electrode and its surrounding paste-like depolarizer stationary, or in proper spaced relation to the metal casing, I provided longitudinally extending spacing rods, shown in said patent as 23', these rods being bound to the covered depolarizer body by suitable bands.

In practice however I have found that this manner of spacing the positive electrode relative to the negative electrode is unsatisfactory, and also expensive from a manufacturing standpoint. There is a tendency of the bands, or securing means of the spacing rod to wear away, thus allowing the rods to fall out of place and consequently permitting the positive electrode to wobble or shift toward one side of the negative electrode, and furthermore any variation in the cross diameter of the spacing sticks or rods will result in the inaccurate centering of the positive electrode. Such variation in cross diameter is liable to exist in the rods at the time they are first applied, or may occur through shrinkage, warping and the like when the rods have been in use in the battery for any pronounced length of time.

It is important, for the attainment of the highest efficiency in the battery, that the centering of the positive electrode relative to the negative electrode be had and maintained with the greatest possible accuracy and exactitude. This must be so, because if the positive electrode be positioned closer to one side of the wall of the negative electrode than to the opposite side of such wall the chemical reaction of the battery will be greater at one side than at the other, causing an uneven action and distribution of the current, and consequently impairing and reducing the efficiency of the battery.

To insure the proper positioning or centering of this positive electrode is the purpose of the present invention. I provide a simple yet exceedingly efficient means for accomplishing this purpose, such means as herein illustrated comprising plate-like disks adapted to extend completely across the annular space between the positive electrode and the negative electrode or metallic casing, these disks having openings for the passage of the end portions of the positive electrode. When made by machinery, these spacing disks, preferably of fiber board, may be produced in vast quantities at an exceedingly low cost, and each disk will be an exact duplicate of the others as to size, dimensions and shape, so that accurate fitting when in use in the battery is insured. Furthermore these disks may not only be fitted in the battery with much more rapidity and far less labor than the spacing rods of my earlier patent, but the uppermost of the disks will act as a cover or confining plate for the upper level of the fluid-like electrolyte and prevent the latter splashing or swishing about in the casing.

My invention consists in the construction, combination and arrangement of parts set forth in and falling within the scope of the appended claims.

In the accompanying drawing:

Figure 1 is a longitudinal sectional view taken through a battery cell embodying my invention.

Fig. 2 is a perspective view of one of the fiber spacing rings or disks.

Referring to the drawing in detail and particularly to Fig. 1, the covered zinc or lead casing forming the negative electrode is shown at 1, 2 is the carbon core or positive electrode, 3 is the paste-like depolarizer surrounding the positive electrode and covered with a thin pervious fabric, 4, this fabric being of cheese cloth or the like, while 5 is the terminal for the positive electrode and 6 the terminal of the negative electrode. As these parts are substantially the same as those described in my prior patent aforesaid, no detailed description is necessary. However, positive electrode 2, in the present instance extends below the bottom line of the depolarizer material 3, as shown at 7, and also projects above the top line of this depolarizer as shown at 8, and as is the case with my earlier patent. The ends of the covered fabric 4 of the depolarizer body 3 are formed into collars which are pasted to or hug the positive electrode as shown at 9.

To properly center the positive electrode and its depolarizer relative to the inner wall of the casing or negative electrode 1, thereby forming a uniform annular space or chamber for the reception of the fluid-like electrolyte, 10, I prefer to use a pair of annular spacing disks such as are shown at 11 each disk having its central opening 12 of a size to permit the passage of the positive electrode. In use one of these disks rests upon the bottom of the battery casing and tightly embraces the adjacent end of the electrode 2 and also confining the adjacent collar-like end of the depolarizer cover 4. The peripheral edge of this lower disk contacts firmly with the wall of the casing. Likewise the upper spacing disk 11 embraces the positive electrode 2, the adjacent collar-like end of the depolarizer cover 4 and contacts at its peripheral edge with the wall of the casing. This top disk rests upon the top end of the depolarizer body 3 and acts to cover and confine the fluid-like electrolyte 10 against splashing, and also tends to retard the accumulation of gas in the battery.

From the above description taken in connection with the accompanying drawing the construction of my improved battery will be readily understood. When the battery is completely assembled as will be understood by reference to Fig. 1 a completely closed and sealed structure is provided wherein the spilling and splashing of the electrolyte is prevented, and the greatest efficiency in chemical reaction and current distribution is obtained for the reasons previously mentioned.

While I have herein shown and described a preferred embodiment of my invention I wish it to be understood that I do not limit myself to all the precise details set forth, as modification and variation may be made without departing from the spirit of the invention or exceeding the scope of the appended claims.

What is claimed is:

1. In a battery, an electrode comprising a core-like member and an inclosure surrounding and attached to said electrode, the ends of the electrode extending beyond said inclosure; the electrode and the inclosure defining therebetween an annular space in which is contained a depolarizing medium.

2. In a battery, an electrode comprising a core-like member, a depolarizing medium surrounding the central portion of said core, and a cover inclosing and retaining the depolarizing medium, the said cover being fixed to both ends of the electrode, said both ends extending beyond the depolarizing medium and its cover.

3. In a battery, an electrode comprising a core-like member, a depolarizing cover comprising a cylindrical body and two end collars, said collars fitting over and fixed to both ends of the electrode; the cylindrical body and electrode defining therebetween an annular space in which is contained a depolarizing medium.

4. In a battery, an electrode comprising a core-like member, an inclosure surrounding and attached to said electrode, the ends of the electrode extending beyond said inclosure; the electrode and the inclosure defining therebetween an annular space in which is contained a depolarizing medium, and an annular disk fitted over the bottom end of the electrode.

5. In a battery, an electrode comprising a core-like member, a depolarizer cover comprising a cylindrical body and two end collars, said collars fitting over and fixed to both ends of the electrode; the cylindrical body and the electrode defining therebetween an annular space in which is contained a depolarizing medium and an annular disk fitted over the bottom collar of said cover.

6. A storage battery including a casing constituting a negative electrode, a core-like member positioned centrally and longitudinally within and spaced apart from the side wall of the casing and constituting a positive electrode, a depolarizer body in which said positive electrode is embedded with the ends of said electrode extending beyond the ends of the depolarizer body, an annular space being left between the depolarizer body and the adjacent side wall of the casing, a fluid-like electrolyte occupying said annular space, and like disk spacing members fitted over each extended end of the positive electrode and extending completely across the annular space between the positive electrode and the negative electrode, one of said disks lying contiguous to the upper end of the depolarizer body and confining the fluid-like electrolyte against splashing.

In testimony whereof I have hereunto set my hand.

HENRY CSANYI.